United States Patent
Friesen et al.

(10) Patent No.: US 8,256,261 B2
(45) Date of Patent: Sep. 4, 2012

(54) METHOD OF MAKING THROUGH-PASSAGES IN SHEET METAL PARTS

(75) Inventors: Dieter Friesen, Paderborn (DE); Horst Hinzpeter, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 381 days.

(21) Appl. No.: 12/693,566

(22) Filed: Jan. 26, 2010

(65) Prior Publication Data
US 2010/0186474 A1 Jul. 29, 2010

(30) Foreign Application Priority Data
Jan. 28, 2009 (DE) .......................... 10 2009 006 496

(51) Int. Cl.
*B21D 31/02* (2006.01)
(52) U.S. Cl. .................. 72/370.27; 72/377; 72/379.2
(58) Field of Classification Search .............. 72/324, 72/327, 334, 348, 349, 370.27, 379.2, 479
See application file for complete search history.

(56) References Cited

U.S. PATENT DOCUMENTS

| | | | | | |
|---|---|---|---|---|---|
| 2,213,574 | A | * | 9/1940 | Weston | 72/479 |
| 3,131,758 | A | * | 5/1964 | Kern et al. | 29/890.047 |
| 3,468,147 | A | * | 9/1969 | Davies | 72/112 |
| 3,682,122 | A | * | 8/1972 | Haddon et al. | 72/348 |
| 3,683,657 | A | * | 8/1972 | Davies | 72/112 |
| 4,184,355 | A | * | 1/1980 | Kozima | 72/327 |
| 5,715,721 | A | * | 2/1998 | Anders et al. | 72/311 |
| 6,347,900 | B1 | * | 2/2002 | Sadakata et al. | 72/379.2 |

FOREIGN PATENT DOCUMENTS
EP 2 000 335 A2 12/2008
* cited by examiner

*Primary Examiner* — David B Jones
(74) *Attorney, Agent, or Firm* — Henry M. Feiereisen; Ursula B. Day

(57) ABSTRACT

In a method of making through-passages in a perforated U-shaped sheet metal part, an inner core is positioned between confronting legs of the sheet metal part in an area of holes, and a support bar is inserted through one hole into the sheet metal part for support of a backside of the inner core. A shaping punch is inserted through another opposite hole into the inner core, thereby forming an inwardly directed collar. After retracting the support bar and the shaping punch and transferring the sheet metal part to replace the first inner core with a second inner core, a centering bar is inserted through the collared hole into the sheet metal part to center the sheet metal part in relation to the centering bar and to support a backside of the other inner core. A further shaping punch is then inserted into the second inner core through the first hole, thereby forming an inwardly directed collar so that the two collars are aligned and form through-passages.

11 Claims, 1 Drawing Sheet

METHOD OF MAKING THROUGH-PASSAGES IN SHEET METAL PARTS

CROSS-REFERENCES TO RELATED APPLICATIONS

This application claims the priority of German Patent Application, Serial No. 10 2009 006 496.6, filed Jan. 28, 2009, pursuant to 35 U.S.C. 119(a)-(d), the content of which is incorporated herein by reference in its entirety as if fully set forth herein.

BACKGROUND OF THE INVENTION

The present invention relates to a method of making through-passages in sheet metal parts.

The following discussion of related art is provided to assist the reader in understanding the advantages of the invention, and is not to be construed as an admission that this related art is prior art to this invention.

European patent document EP 2 000 335 A2 describes a method of making an axle component which is composed from a longitudinal profile of sheet metal and is formed on both ends with a bearing receptacle, respectively. The longitudinal profile is a single-piece U-shaped press shell with a first wall side which is traversed by the bearing receptacles and in opposition to the first wall side a second wall side which is traversed by bearing receptacles. The axle components is made by first cutting the metal sheet to size and then angling the metal sheet by 90° in relation to the edge support that has been shaped beforehand to form a first wall side. The first wall side is holed in the area of the later bearing receptacle. Through-passages are then formed at the holes. Thereafter, the second wall side is angled by 90° in relation to the edge support so that the wall sides are positioned in direct opposition. The second wall side is then holed in the area of the later bearing receptacles and provided with a through-passage. A rubber-metal bearing is later placed in these holes. In this manufacturing sequence, the first through-passage is made before the second wall side is angled by 90° and disposed in opposition to the first wall side. As a consequence of the manufacturing process, the through-passage and thus the collars point outwards, i.e. away from one another.

Sheet metal parts involved here are often used as links of multilink suspensions for motor vehicles and considered articles of mass production. Thus, when production of a certain minimum number is involved, the manufacturing process should be cost-efficient and quick in order to be economically viable. Transfer tools or follow-on composite tools are typically used for this purpose. In a follow-on composite tool, a sheet metal blank is advanced incrementally until a series of successive tool stations has been passed. This is normally implemented in a single forming press with sufficiently large tool table. At the end of the forming process, the workpiece is separated from the so-called carrier strip and cut in pieces. In a transfer tool, single sheet metal blanks are cut in a cutting station and then transported by suitable grippers or by a transfer device which is coupled with the press step by step or from tool set to tool set. Also used are hand insertion sets in which the workpiece is moved by hand from tool set to tool set.

Regardless whether transfer tools or follow-on composite tools are used, the realization in U-shaped metal sheets of inner through-passages, i.e. holes which are formed with a circumferential collar, with the collar in one leg pointing towards the collar in the opposite leg, i.e. collars that project inwardly, is difficult and requires a separate manufacturing step carried out by a special machine tool. As a result, production costs are increased.

It would therefore be desirable and advantageous to provide an improved method of making inner through-passages in U-shaped sheet metal parts to obviate prior art shortcomings in a cost-efficient and reliable manner.

SUMMARY OF THE INVENTION

According to one aspect of the present invention, a method of making inwardly collared through-passages in confronting legs of a sheet metal part of U-shaped cross section includes the steps of positioning a first inner core in relation to a perforated sheet metal part between the legs of the sheet metal part in an area of holes, inserting a support bar through a first one of the holes into the sheet metal part for support of a backside of the first inner core, inserting into the first inner core a first shaping punch through a second one of the holes in opposition to the first hole, thereby forming an inwardly directed first collar, with the first inner core shaping an outside of the first collar and the first shaping punch forming an inside of the first collar, retracting the support bar and the first shaping punch, transferring the sheet metal part to replace the first inner core with a second inner core, inserting into the sheet metal part a centering bar through the collared second hole to center the sheet metal part in relation to the centering bar and to support a backside of the second inner core, and inserting into the second inner core a second shaping punch through the first hole, thereby forming an inwardly directed second collar, with the second inner core shaping an outside of the second collar and the second shaping punch forming an inside of the second collar.

In accordance with the method of the present invention, the sheet metal part configured of U shape and formed with holes in a forming press is positioned in particular in a transfer tool set or follow-on composite set in relation to an inner core which is arranged in the area of the holes between the interconnected opposite wall portions, called legs. A support bar is inserted into the sheet metal part through a first hole for support of the backside of the inner core. The inner core is hereby moved beforehand or simultaneously. Next, a first shaping punch is then inserted through the hole in opposition of the first hole into the interior space demarcated by the legs to thereby form an inwardly projecting collar which thus points in the direction towards the first hole.

While the shaping punch constitutes the forming inner tool for the collar, the inner core constitutes the forming outer tool. Thus, in particular the cylindrical region of the collar can be precisely configured. The inner core in addition supports the inside of the legs against the force applied by the shaping punch. As a result, a collar is formed which feeds into the leg with a small bending radius.

After forming the first collar, the shaping punch and the support bar are retracted. Of course, the inner core is also retracted from the collar being formed by the inner core.

The sheet metal part is then placed in a further tool set so that the first inner core is now replaced by a second inner core which has a shaping portion in confronting relationship to the first hole through which the support bar has previously being guided. This second inner core is also supported, however from the other side by a centering bar by which the sheet metal part is centered at the same time. The centering bar has hereby an outer diameter which matches the inner diameter of the collar being formed previously.

In a same manner as the formation of the first collar, a second shaping punch now moves into the sheet metal part and forms on the first hole a collar which projects inwards into the interior space. Again, the inner core constitutes the forming outer tool for the collar, and the second shaping punch constitutes the forming inner tool of the collar. Thereafter, the previously moved tool components, i.e. the shaping punch, the centering bar and the inner core are returned to their starting position so that the sheet metal part, now formed with through-passages, can be removed from the second tool stage and transferred for further processing.

Even though the steps for making the through-passages may, in theory, also be executed on separate forming machines, it is advantageous when the tool sets, in which the respectively confronting collars are produced at the holes, are part of a transfer tool set with automated or manual transfer or of a follow-on composite tool set of a single forming press. In this way, manufacture of the sheet metal parts is more economically viable than when using several forming presses.

The method according to the present invention allows, of course, also the realization of several collars at the same time. In particular, it is possible to first shape the sheet metal part in the forming press to the U shape and to perforate it, with the through-passages subsequently produced by the method in accordance with the invention. According to another advantageous feature of the present invention, the sheet metal part can be placed onto the first and second inner cores in such a way that the legs are directed in stroke direction of the forming press. In other words, the inner core points also in stroke direction. This means, that the shaping punch and the support bar and centering bar are moved transversely to the inner core and transversely to the stroke direction of the forming press. However, taking into account tolerances and safety constraints, the inner core may also be movable transversely to the stroke direction at least in accordance with the height of the formed collar. This movement can be realized mechanically by wedge gates which are displaced by the closing force when the forming tool is closed. The respective wedge mechanisms can hereby be configured in such a way that the inner core as well as the support bar and centering bar are locked in the support position and forming position, respectively. The locking position is reached, when the inner core and the support and centering bars have reached their end position and can no longer be moved. In other words, there is no longer any support on a slanted wedge surface but on a surface which is perpendicular to the stroke direction. In this way, a displacement of the shaping punch can be realized. All movable components of these tool stages can be displaced by wedge-type mechanisms. Instead of a wedge-type displacement and locking mechanism, it is also conceivable to provide a hydraulic displacement.

The distances by which the inner core and the pertaining support and centering bars are moved can differ. Whereas the inner core can be moved in horizontal direction far enough to allow realization of a collar in an opening of the inner core and withdrawal of the inner core from the collar, the support bar has to be inserted into the interior of the sheet metal part from the leg that is opposite to the collar, so that the stroke travel of the support bar and the centering bar is greater than the one of the inner core.

According to another feature of the present invention, the sheet metal part may be a link of a multilink suspension of a motor vehicle. The aligned through-passages are advantageously used as bearing receptacles for receiving rubber-metal bearings in a subsequent manufacturing step. Examples of material for such axle components include high-strength steel, in particular a dual phase steel comprising ferrite and bainite, which exhibits an intense strain-hardening behavior during the forming process.

According to another advantageous feature of the present invention, the collars may have a substantially rectangular orientation in relation to the legs.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
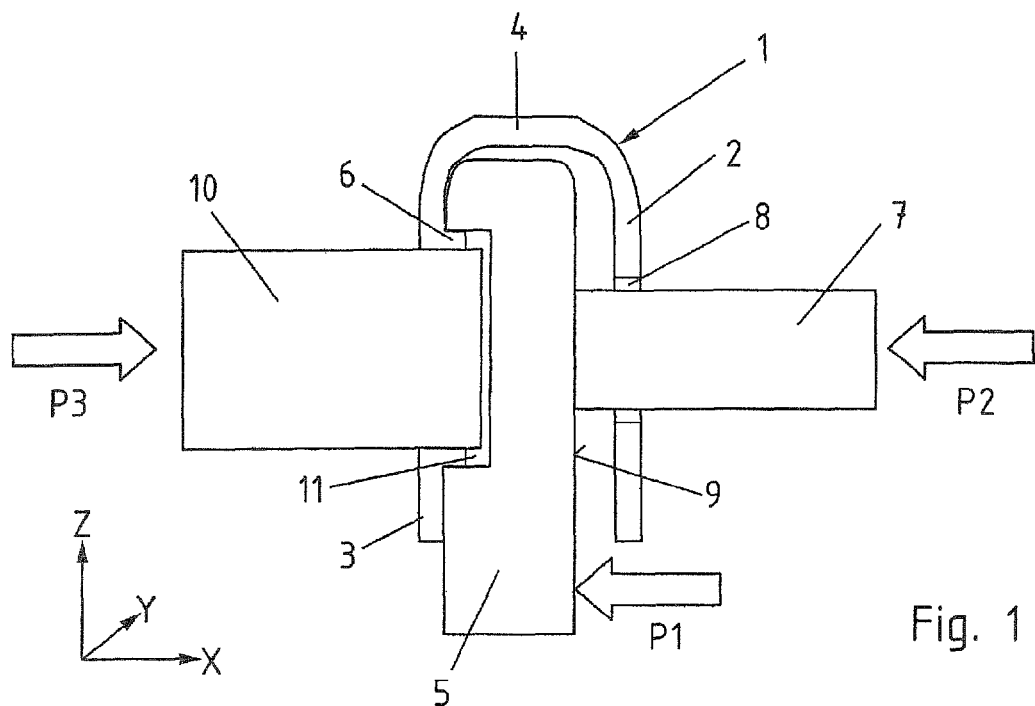
FIG. 1 is a basic representation of a first step of a method according to the present invention for manufacturing a first inwardly directed collar on a sheet metal part.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sheet metal part, generally designated by reference numeral 1 and having a U-shaped cross section, defined by two opposite legs 2, 3 which are connected to one another by a web 4. The legs 2, 3 extend in parallel relationship and are part of a link of a multilink suspension of a motor vehicle. It is intended to provide the ends of the link with bearing receptacles with inwardly directed through-passages for receiving rubber-metal bearings. For this purpose, the pre-shaped and perforated sheet metal part 1 is placed in the illustrated tool stage which is part of a transfer tool set or follow-on composite tool set. It is, of course, also conceivable to make the tool stage part of a hand insertion set.

In order to provide an inwardly directed collar at the pre-holed leg 3, tools are provided which are movable in relation to the sheet metal part 1. These tools involve an inner core 5 which extends in vertical direction of the drawing plane and essentially parallel to the legs 2, 3. The Z direction thus corresponds to the stroke direction of a forming press. The X and Y directions span a processing plane, in particular the plane of the table of the forming press, in which several transfer tool sets or follow-on composite tool sets are arranged.

In the illustrated tool set, the sheet metal part 1 is placed in −Z direction, i.e. effectively from atop, onto the inner core 5. Subsequently, the inner core 5 is moved in the direction of arrow P1 onto the leg 3 on the left-hand side of the drawing plane for formation of an inwardly directed collar 6. The inner core 5 is moved by an unillustrated wedge-type mechanism from a starting position, defined by a distance from the left leg 3, into the illustrated forming position in which the inner core 5 rests against the inside of the leg 3. This forming position of the inner core 5 is locked. In addition, the inner core 5 is supported by moving a support bar 7 through a first hole 8 in the leg 2 against a backside 9 of the inner core 5. In the illustrated position, the support bar 7 assumes already the support position. In the starting position, the support-side end of the support bar 7 is positioned outside the sheet metal part 1 in order to allow placement of the sheet metal part 1 in this tool stage. Arrow P2 more clearly indicates the movement direction of the support bar 7 for preparing the shaping process. Once the inner core 5 and the support bar 7 have been locked in their forming and support positions, respectively, a shaping punch 10 moves in the direction of arrow P3 to form the collar 6 at the original hole in the leg 3. The shaping punch 10 pushes hereby from outside against the leg 3 and serves as forming inner tool for the collar 6. At the same time, the collar 6 is shaped on the outside by the inner core 5. The inner core 5 is hereby formed with a recess 11 in the form of a circular pocket in which the shaping punch 10 penetrates. An annular space is provided between the outside of the shaping punch 10 and the radially inwardly directed inner side of the recess 11 for forming the collar 6.

Figure 2:
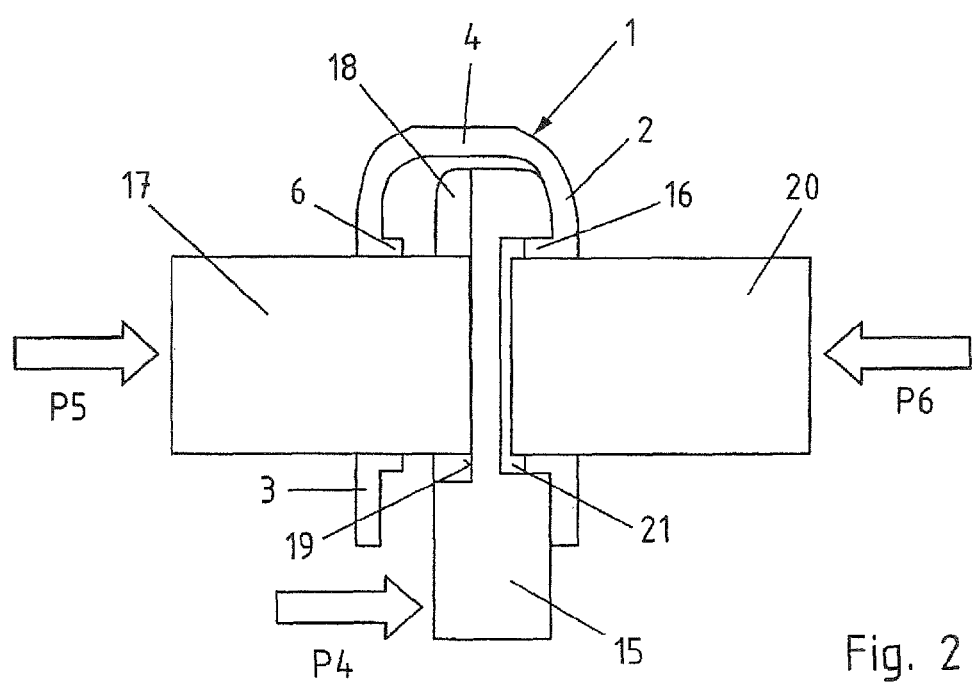
FIG. 2 is a basic representation of a second step of the method according to the present invention for manufacturing a second inwardly directed collar on a sheet metal part in opposition to the first collar.

After the collar 6 has been formed, the shaping punch 10 is moved back in opposition to the arrow direction P3. Subsequently, the support bar 7 is also removed from the sheet metal part 1 in opposition to the arrow direction P2, and the inner core 5 is moved in opposition to the arrow direction P1 to its starting position so that the shaped sheet metal part 1 can be removed in +Z direction from the first tool set and transferred to the second tool set, shown in FIG. 2, for further processing and formation of a second through-passage. The movement of the support bar 7 and the inner core 5 may be carried out simultaneously, although with different stroke lengths.

Like in the afore-described manufacturing sequence, the sheet metal part 1 is placed in −Z direction upon a second inner core 15 having forming regions facing the other leg 2. The inner core 15 is supported in this case by a centering bar 17 which is moved in the direction of arrow P5, i.e. also in +X direction. As a difference to the support bar 7 in FIG. 1, the centering bar 17 has an outer diameter which matches the inner diameter of the collar 6 in the leg 3 so that the sheet metal part 1 is aligned, i.e. centered, for further processing in relation to the centering bar 17.

After the inner core 15 and the centering bar 16 are locked, advantageously by wedge-type mechanisms, in their support and forming positions, respectively, the second collar 16 is made in the leg 2. A second shaping punch 20 is hereby moved in the direction of arrow P6, i.e. in −X direction. The hereby applied forming forces are transmitted from the inner core 15 onto the centering bar 17 which rests upon a backside 19 of the inner core 15.

The difference to first tool stage as shown in FIG. 1 resides in that the backside 19 is slightly recessed in the area of the collar 6 in the direction of the shaping punch 20. As a result, a pocket 18 is defined at the backside of the inner core 15. The pocket 18 is open in +Z direction. The reason for this pocket 18 is the need for the inner core 15 to be removed from the formed sheet metal part 1 after this manufacturing step. The pocket 18 has a depth in correspondence with a depth of the collar 6 in order prevent a collision between the inner core 15, when being withdrawn from the collar 16 in −X direction, and the collar 6 formed beforehand. Provided on the side of the inner core 15 opposite to the pocket 18, i.e. on the shaping side, is a recess 21 for receiving the collar 16 and the shaping punch 20. The wall thickness of the inner core 15 is therefore relatively small, although a massive support is realized on the backside by the centering bar 17 to absorb the forming forces applied by the shaping punch 20.

After conclusion of the second operating cycle, the shaping punch 20 is moved out in +X direction from the finished sheet metal part 1. Then, the inner core 15 and the centering bar 17 are moved in −X direction so that the finished sheet metal part 1 can be removed upwards from the tool stage. Thereafter, rubber-metal bearings can be placed in the inner through-passages.

The method according to the present invention allows the formation of inner through-passages in two operating cycles by inwardly collaring a first side of the perforated sheet metal part. Then, this first side is received and centered in order to inwardly collar the second side of the perforated sheet metal part. As a result, the method according to the present invention is reliable and allows rapid formation of inner through-passages by means of transfer or follow-on composite tool sets or also by hand insertion tool sets. The need for cost-intensive special machine tools can thus be omitted.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in he appended claims and includes equivalents of the elements recited therein:

1. A method of making inwardly collared through-passages in confronting legs of a sheet metal part of U-shaped cross section, said method comprising the steps of:
   positioning a first inner core in relation to a perforated sheet metal part between the legs of the sheet metal part in an area of holes;
   inserting a support bar through a first one of the holes into the sheet metal part for support of a backside of the first inner core;
   inserting into the first inner core a first shaping punch through a second one of the holes in opposition to the first hole, thereby forming an inwardly directed first collar, with the first inner core shaping an outside of the first collar and the first shaping punch forming an inside of the first collar;
   retracting the support bar and the first shaping punch;
   transferring the sheet metal part to replace the first inner core with a second inner core;
   inserting into the sheet metal part a centering bar through the collared second hole to center the sheet metal part in relation to the centering bar and to support a backside of the second inner core; and
   inserting into the second inner core a second shaping punch through the first hole, thereby forming an inwardly directed second collar, with the second inner core shaping an outside of the second collar and the second shaping punch forming an inside of the second collar.

2. The method of claim 1, wherein the second inserting step is executed in a first tool set and the fourth inserting step is executed in a second tool set, said first and second tool sets being part of a member selected from the group consisting of transfer tool set, follow-on composite tool set, and hand insertion set of a single forming press.

3. The method of claim 2, wherein the sheet metal part is formed in the forming press into the U-shape and perforated.

4. The method of claim 2, wherein the sheet metal part is placed onto the first and second inner cores in such a way that the legs are directed in stroke direction of the forming press.

5. The method of claim 1, wherein at least one of the first and second inner cores is moved prior to shaping the respective one of the collars, from an initial position to a forming position in a direction of the one of the first and second holes to be collared.

6. The method of claim 5, wherein the moving step is executed by a wedging mechanism to lock the at least one of the first and second inner cores in the forming position.

7. The method of claim 1, wherein at least one member selected from the group consisting of the support bar and the centering bar is moved by a wedging mechanism to lock the member in a support position.

8. The method of claim 5, wherein the first inner core is moved by a distance which is smaller than a distance of movement of the support bar, and the second inner core is moved by a distance which is smaller than a distance of movement of the centering bar.

9. The method of claim 1, wherein the first and fourth inserting steps are executed to produce a plurality of collars, respectively.

10. The method of claim 1, wherein the sheet metal part is a link of a multilink suspension of a motor vehicle, with the first and second collars defining aligned through-passages to form bearing receptacles for receiving rubber-metal bearings.

11. The method of claim 1, wherein the collars have a substantially rectangular orientation in relation to the legs.

* * * * *